US009723115B2

(12) United States Patent
Abdullahi

(10) Patent No.: US 9,723,115 B2
(45) Date of Patent: Aug. 1, 2017

(54) MAGNIFICATION SYSTEM

(71) Applicant: Wahib Abdullahi, Ashburn, VA (US)

(72) Inventor: Wahib Abdullahi, Ashburn, VA (US)

( * ) Notice: Subject to any disclaimer, the term of this patent is extended or adjusted under 35 U.S.C. 154(b) by 13 days.

(21) Appl. No.: 14/963,355

(22) Filed: Dec. 9, 2015

(65) Prior Publication Data

US 2017/0171369 A1   Jun. 15, 2017

(51) Int. Cl.
*H04B 1/38* (2015.01)
*H04M 1/00* (2006.01)
*H04M 1/02* (2006.01)
*G02B 25/00* (2006.01)
*H04B 1/3888* (2015.01)
*H04M 1/04* (2006.01)
*G06F 1/16* (2006.01)

(52) U.S. Cl.
CPC .......... *H04M 1/027* (2013.01); *G02B 25/002* (2013.01); *H04B 1/3888* (2013.01); *G02B 25/005* (2013.01); *G06F 1/1615* (2013.01); *H04M 1/04* (2013.01)

(58) Field of Classification Search
CPC .. H04B 1/3888; H04B 1/3833; H04B 1/3816; H04M 1/0237; H04M 1/027; H04M 1/04; G06F 1/1656; G06F 1/1626; G06F 1/1637; G06F 1/1615; G02B 25/005
USPC .......... 455/90.3, 575.8, 566, 575.1
See application file for complete search history.

(56) References Cited

U.S. PATENT DOCUMENTS

| 3,711,679 | A |   | 1/1973  | Moschkau et al. |
| 5,075,799 | A | * | 12/1991 | Pine ..................... G02B 25/002 224/667 |
| 5,357,646 | A |   | 10/1994 | Kim |
| 5,969,828 | A |   | 10/1999 | Kawasaki et al. |
| D652,593  | S |   | 1/2012  | Wu |
| D695,731  | S | * | 12/2013 | Adami .................. D14/250 |
| D745,507  | S | * | 12/2015 | Adami .................. D14/250 |
| 2005/0155963 | A1 |   | 7/2005 | Sage |
| 2007/0155436 | A1 | * | 7/2007 | Wu ..................... H04M 1/0266 455/566 |
| 2011/0099742 | A1 |   | 5/2011 | Venalainen |
| 2012/0244918 | A1 | * | 9/2012 | Hall ..................... H04B 1/3888 455/575.4 |
| 2015/0172431 | A1 | * | 6/2015 | Huang ................ H04B 1/3888 455/556.1 |
| 2016/0156754 | A1 | * | 6/2016 | Cotelo ................. H04M 1/027 455/575.8 |

FOREIGN PATENT DOCUMENTS

WO         WO03066396         8/2003

* cited by examiner

Primary Examiner — Olumide T Ajibade Akonai

(57) ABSTRACT

A magnification system includes an electronic device that has a display. The display may display an image. A case is provided and the case has the electronic device is removably positioned within the case such that the display is visible. A magnifier is removably coupled to the case. Thus, the magnifier magnifies the image on the display thereby enhancing visibility of the image.

6 Claims, 3 Drawing Sheets

MAGNIFICATION SYSTEM

BACKGROUND OF THE DISCLOSURE

Field of the Disclosure

The disclosure relates to magnification devices and more particularly pertains to a new magnification device for magnifying an image displayed on an electronic device.

SUMMARY OF THE DISCLOSURE

An embodiment of the disclosure meets the needs presented above by generally comprising an electronic device that has a display. The display may display an image. A case is provided and the case has the electronic device is removably positioned within the case such that the display is visible. A magnifier is removably coupled to the case. Thus, the magnifier magnifies the image on the display thereby enhancing visibility of the image.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
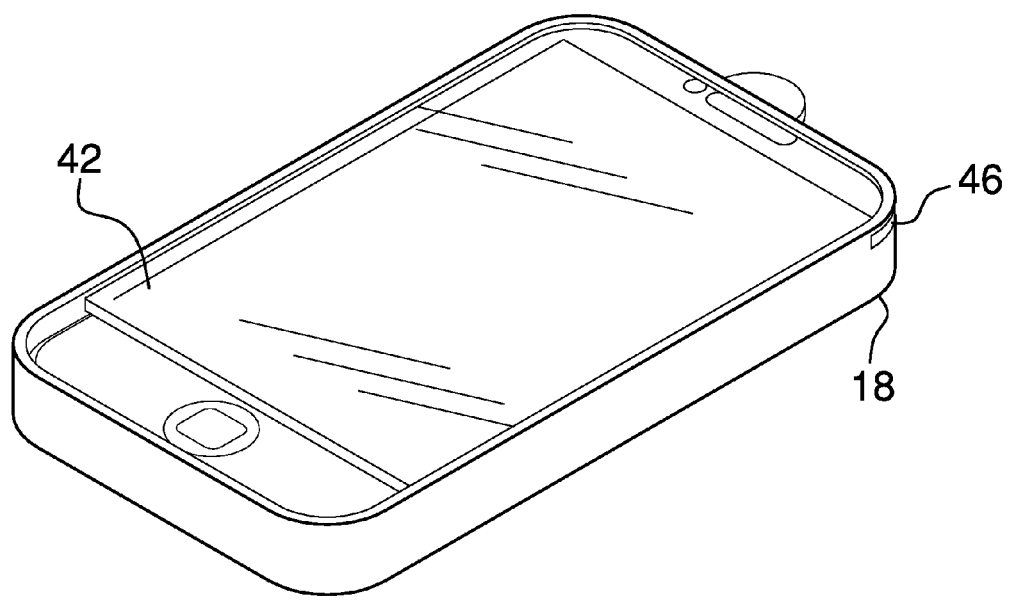
FIG. 1 is a top perspective view of a magnification system according to an embodiment of the disclosure.
Figure 2:
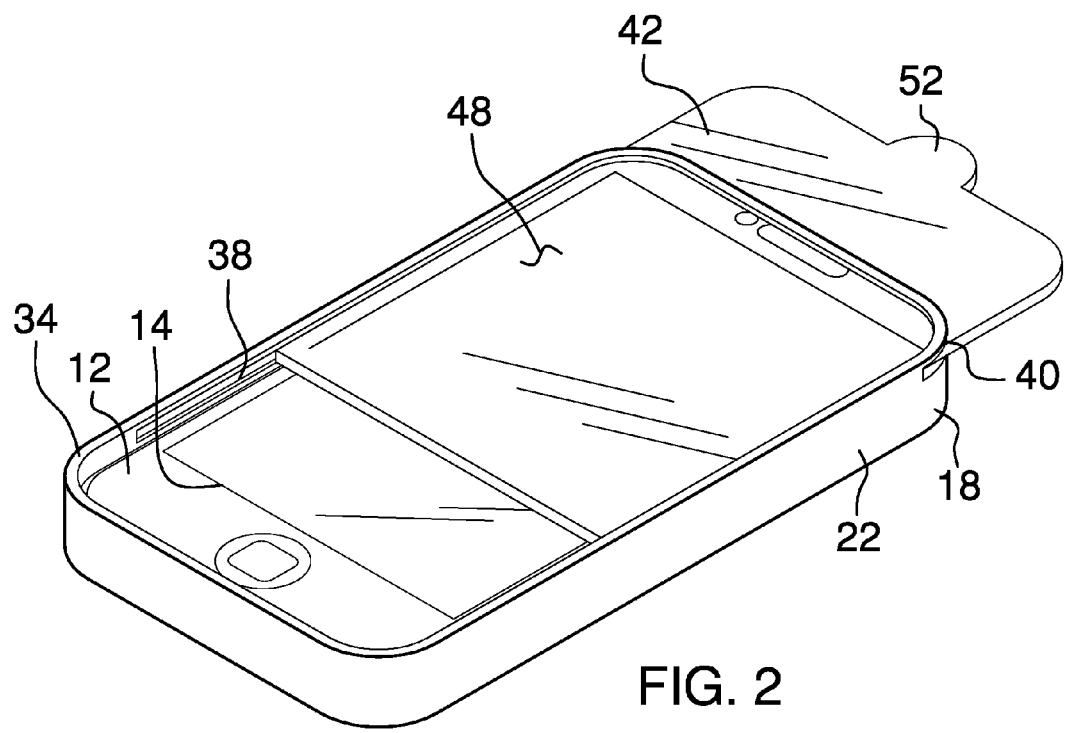
FIG. 2 is a perspective view of an embodiment of the disclosure.
Figure 3:
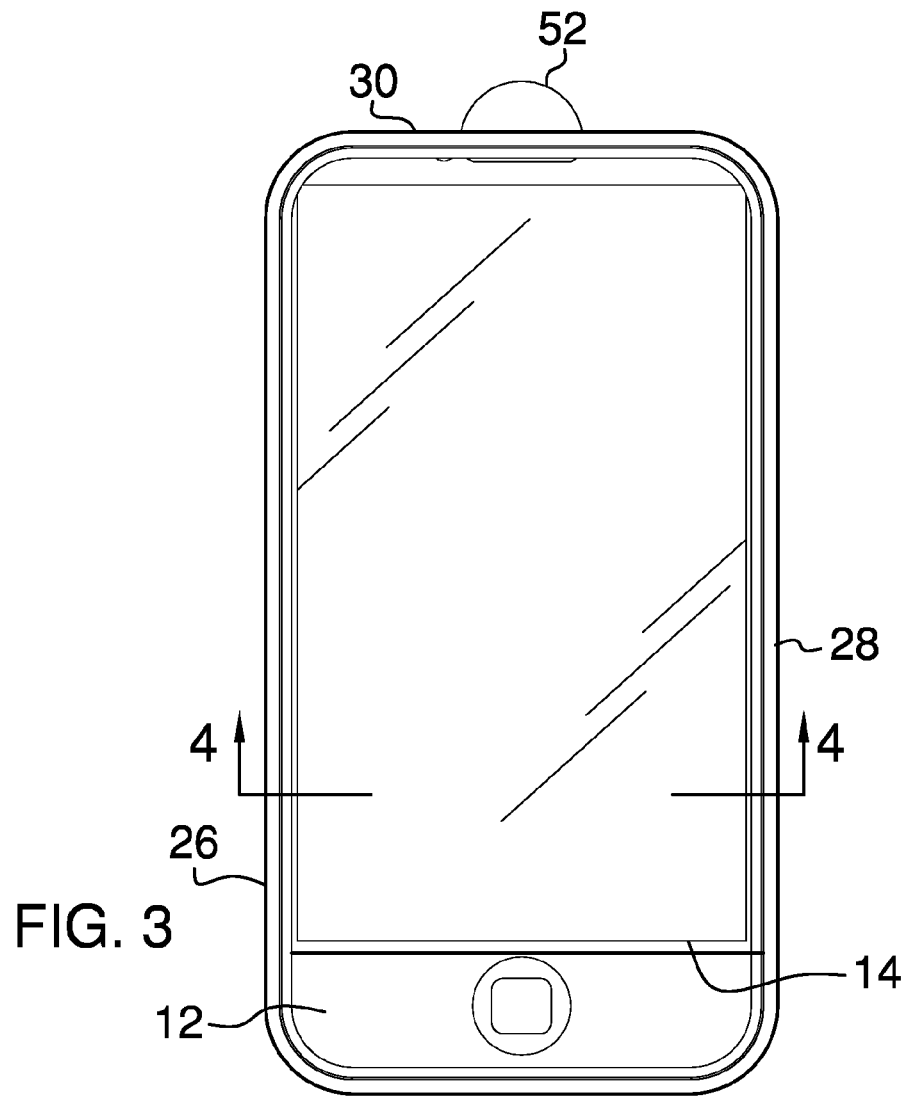
FIG. 3 is a top view of an embodiment of the disclosure.
Figure 4:
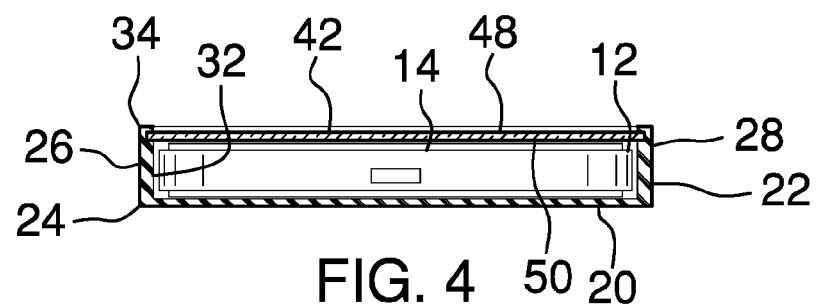
FIG. 4 is a cross sectional view taken along line 4-4 of FIG. 3 of an embodiment of the disclosure.
Figure 5:
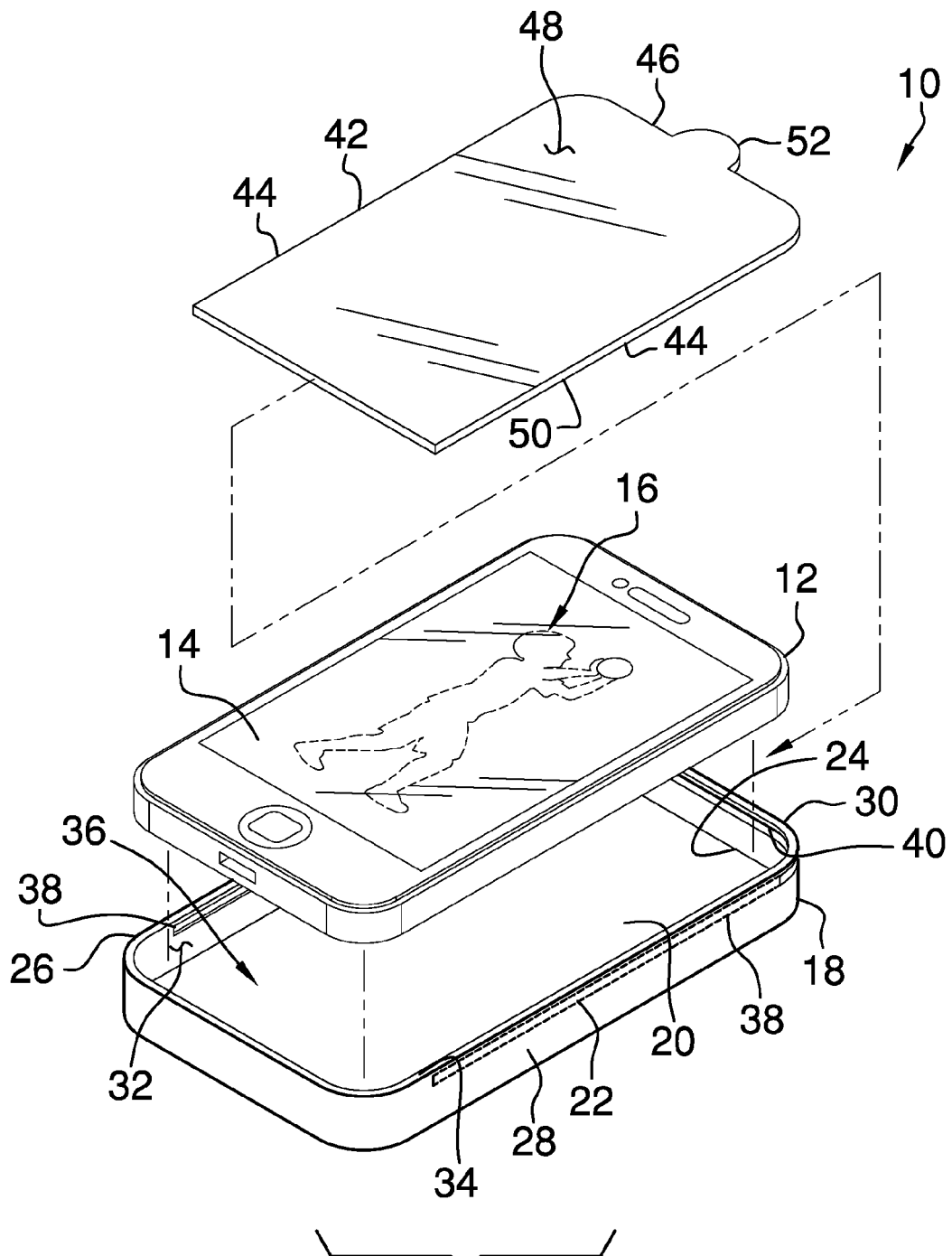
FIG. 5 is an exploded perspective view of an embodiment of the disclosure.

With reference now to the drawings, and in particular to FIGS. 1 through 5 thereof, a new magnification device embodying the principles and concepts of an embodiment of the disclosure and generally designated by the reference numeral 10 will be described.

As best illustrated in FIGS. 1 through 5, the magnification system 10 generally comprises an electronic device 12 that has a display 14 and the display 14 may display an image 16. The electronic device 12 may be a smart phone or the like. The image 16 may comprise a photograph, text or any other image viewed on a smart phone. A case 18 is provided and the electronic device 12 is removably positioned within the case 18 such that the display 14 is visible. The case 18 may comprise a smart phone case or the like.

The case 18 has a basal wall 20 and a perimeter wall 22 extending upwardly from the basal wall 20. The perimeter wall 22 is coextensive with an outer edge 24 of the basal wall 20. The perimeter wall 22 has a first lateral side 26, a second lateral side 28 and a front side 30. The perimeter wall 22 has an inner surface 32 and a distal edge 34 with respect to the basal wall 20 to define an opening 36 into the case. The display 14 is aligned with the opening 36 when the electronic device 12 is positioned within the case 18.

The inner surface 32 corresponding to each of the first lateral side 26 and the second lateral side 28 has an associated one of a pair of grooves 38 extending outwardly therein. Each of the grooves 38 is substantially coextensive with the associated first lateral side 26 and the second lateral side 28. Each of the grooves 38 is positioned closer to the distal edge 34 than the basal wall 20. The front side 30 has a slot 40 extending therethrough. The slot 40 extends between the first lateral side 26 and the second lateral side 28 such that the slot 40 intersects each of the grooves 38.

A magnifier 42 is removably coupled to the case 18. The magnifier 42 has a pair of lateral edges 44, a front edge 46, a top surface 48 and a bottom surface 50. The top surface 48 is concavely arcuate with respect to the bottom surface 50. Thus, the magnifier 42 magnifies the image 16 on the display 14 thereby enhancing visibility of the image 16.

The magnifier 42 is slidably inserted into the slot 40 such that each of the lateral edges 44 is positioned within an associated one of the grooves 38. The magnifier 42 is positioned to completely cover the opening 36 such that the bottom surface 50 is spaced from the display 14. The magnifier 42 may have a focal length ranging between approximately five mm and one cm. A tab 52 extends away from the front edge 46 of the magnifier 42. The tab 52 may be manipulated thereby facilitating the magnifier 42 to be inserted into and removed from the case 18.

In use, the electronic device 12 is positioned in the case 18 and the electronic device 12 is utilized in the conventional means of utilizing a smart phone or the like. The magnifier 42 is slidably inserted into the slot 40 when the image 16 is viewed on the display 14. The magnifier 42 magnifies the image 16 such that the image 16 is visible without the use of reading glasses or other visual aids. The magnifier 42 may be left in the case 18 or the magnifier 42 may be selectively removed from the case 18.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A magnification system comprising:

an electronic device having a display, said display being configured to display an image;

a case having said electronic device being removably positioned within said case such that said display is visible, said case having a basal wall and a perimeter wall extending upwardly from said basal wall, said perimeter wall being coextensive with an outer edge of said basal wall, said perimeter wall having a first lateral side, a second lateral side and a front side, said perimeter wall having an inner surface and a distal edge with respect to said basal wall to define an opening into said case, said display being aligned with said opening when said electronic device is positioned within said case, said inner surface corresponding to each of said first lateral side and said second lateral side has an associated one of a pair of grooves extending outwardly therein, each of said grooves being substantially coextensive with said associated first lateral side and said second lateral side; and a magnifier being removably coupled to said case wherein said magnifier is configured to magnify the image on said display thereby enhancing visibility of the image, said magnifier having a pair of lateral edges and a front edge, said magnifier being slidably inserted into said slot such that each of said lateral edges is positioned within an associated one of said grooves.

2. The system according to claim 1, further comprising each of said grooves being positioned closer to said distal edge than said basal wall.

3. The system according to claim 1, wherein said front side has a slot extending therethrough, said slot extending between said first lateral side and said second lateral side such that said slot intersects each of said grooves.

4. The system according to claim 3, further comprising each said groove extending partially along a full length of said inner surface corresponding to each of said first lateral side and said second lateral, said magnifier being positioned to completely cover said display when said magnifier is fully inserted into said slot.

5. The system according to claim 4, wherein said magnifier has a tab extending away from said front edge wherein said tab is configured to be manipulated thereby facilitating said magnifier to be inserted into and removed from said case.

6. A magnification system comprising:

an electronic device having a display, said display being configured to display an image;

a case having said electronic device being removably positioned within said case such that said display is visible, said case having a basal wall and a perimeter wall extending upwardly from said basal wall, said perimeter wall being coextensive with an outer edge of said basal wall, said perimeter wall having a first lateral side, a second lateral side and a front side, said perimeter wall having an inner surface and a distal edge with respect to said basal wall to define an opening into said case, said display being aligned with said opening when said electronic device is positioned within said case, said inner surface corresponding to each of said first lateral side and said second lateral side having an associated one of a pair of grooves extending outwardly therein, each said groove extending partially along a full length of said inner surface corresponding to each of said first lateral side and said second lateral, each of said grooves being positioned closer to said distal edge than said basal wall, said front side having a slot extending therethrough, said slot extending between said first lateral side and said second lateral side such that said slot intersects each of said grooves; and a magnifier being removably coupled to said case wherein said magnifier is configured to magnify the image on said display thereby enhancing visibility of the image, said magnifier having a pair of lateral edges and a front edge, said magnifier being slidably inserted into said slot such that each of said lateral edges is positioned within an associated one of said grooves, said magnifier being positioned to completely cover said display such that said magnifier is spaced from said display, said magnifier having a tab extending away from said front edge wherein said tab is configured to be manipulated thereby facilitating said magnifier to be inserted into and removed from said case.

* * * * *